United States Patent
Wong et al.

(10) Patent No.: US 8,187,095 B2
(45) Date of Patent: May 29, 2012

(54) UNIVERSAL GAME CONSOLE CONTROLLER

(75) Inventors: Ling Jun Wong, Escondido, CA (US); Utkarsh Pandya, San Diego, CA (US); Biranchi Narayan Rout, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 947 days.

(21) Appl. No.: 12/190,228

(22) Filed: Aug. 12, 2008

(65) Prior Publication Data
US 2010/0041480 A1 Feb. 18, 2010

(51) Int. Cl.
*A63F 9/24* (2006.01)
(52) U.S. Cl. ............... 463/36; 463/37; 463/46; 340/5.1; 340/5.32; 340/5.61; 340/10.1; 341/169; 341/173; 341/176
(58) Field of Classification Search .................... 463/37, 463/46; 340/5.1, 5.32, 5.61, 10.1; 341/169, 341/173, 176
See application file for complete search history.

(56) References Cited

U.S. PATENT DOCUMENTS

| | | | |
|---|---|---|---|
| 5,896,125 A | | 4/1999 | Niedzwiecki |
| 6,133,847 A * | | 10/2000 | Yang .......................... 340/12.25 |
| 6,279,906 B1 | | 8/2001 | Sanderson et al. |
| 7,230,563 B2 * | | 6/2007 | Vidal .............................. 341/176 |
| 7,610,555 B2 * | | 10/2009 | Klein et al. ................... 715/738 |
| 7,831,930 B2 * | | 11/2010 | Dresti et al. .................. 715/835 |
| 2004/0070491 A1 * | | 4/2004 | Huang et al. ................. 340/10.5 |
| 2006/0258458 A1 | | 11/2006 | Addington et al. |

OTHER PUBLICATIONS

"X-Arcade Works with any Game System, PC or Mac TM !" http://www.athomedownunder.com/htm/installation.shtml.
"Console Specialty Controller Roundup" http://archive.gamespy.com/hardware/december02/consolespecial/index2.shtml.
"PS2 Universal Controller Adapter" http://www.ztnetstore.com/product_info.php/products_id/271.
"Universal Controller Adapter by Gemini" http://www.estarland.com/produt29472.html.

* cited by examiner

*Primary Examiner* — Sunit Pandya
(74) *Attorney, Agent, or Firm* — John L. Rogitz

(57) ABSTRACT

A universal game console controller that has an LCD presenting, depending on what type of game console a user has input, a controller key layout for a first type of game console or a controller key layout for a second type of game console.

15 Claims, 1 Drawing Sheet

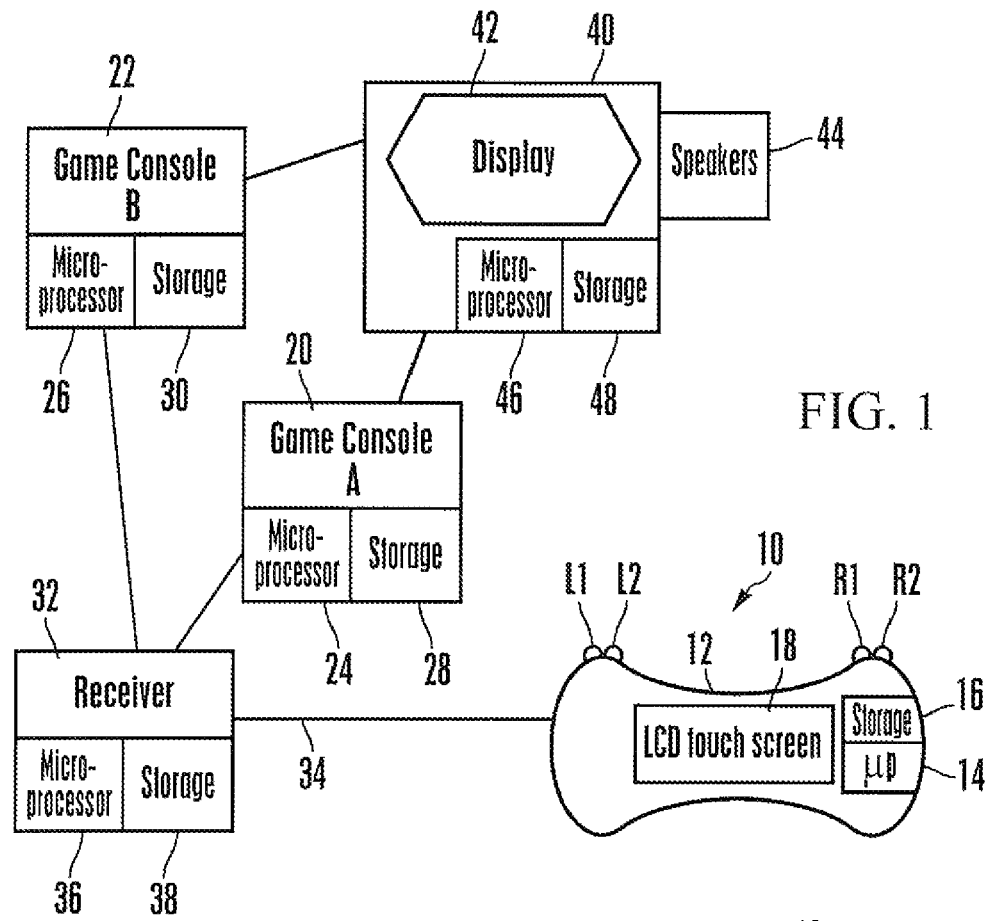
FIG. 1
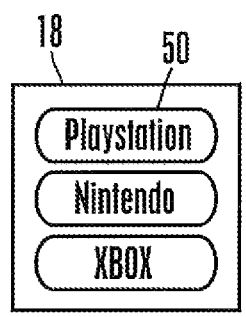
FIG. 2
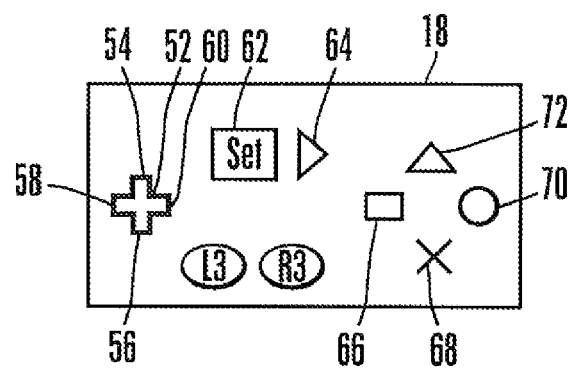
FIG. 3
FIG. 4
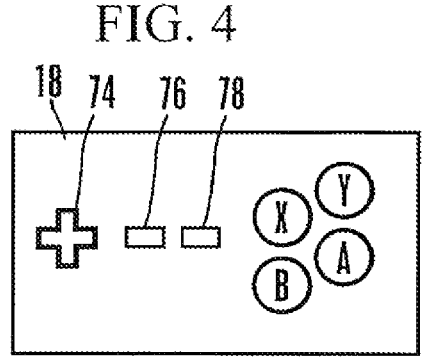
FIG. 5
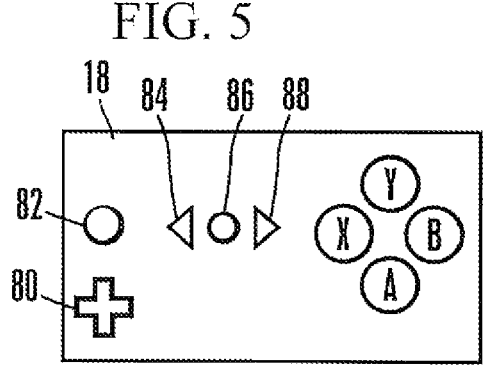

UNIVERSAL GAME CONSOLE CONTROLLER

FIELD OF THE INVENTION

The present invention relates generally to universal game console controllers.

BACKGROUND OF THE INVENTION

Just like remote controls, game consoles, and thus game controllers, are becoming widespread. It is not surprising to find more than one game consoles in a household, especially when competing game console manufacturers attempt to attract unconventional consumer groups in the gaming industry. As understood herein, it would be useful to have a universal controller that would be able to work with a variety of game consoles.

SUMMARY OF THE INVENTION

A game console controller includes a hand-holdable housing and a touch sensitive liquid crystal display (LCD) on the housing. The LCD is caused to present, depending on what type of game console a user has selected, a controller key layout for a first type of game console or a controller key layout for a second type of game console. A key layout includes plural keys selectable by a user to input commands to a game console.

In some embodiments the LCD can be caused to present a controller key layout for a third type of game console. A controller key layout for one and only one game console may be presented at one time on the display. The controller may include a controller processor controlling the display and receiving layout signals from a receiver, in response causing the display to present either the first or the second layout.

In a non-limiting example, the first layout includes navigation keys and action keys and specifically can include a navigation symbol that is cruciform in shape and that includes an up key, a down key, a left key, and a night key. The first layout may also include, in a horizontal row, a select key and a start key and below the select and start keys, L3 and R3 symbols. The first layout can also include, to the right of the select key and start key, action keys arranged in a diamond configuration and respectively shaped as a square, an "x", a circle, and a triangle.

In contrast, the second layout can include a select key and a start key, action X, Y, A, and B being presented on a right part of the display. In another embodiment, the second layout can include, in a row from left to right, a "previous menu" key, an "exit" key, and a start key, with keys X, Y, A, and B being presented in a box-like or cruciform-like arrangement on a right part of the display.

In another aspect, an apparatus includes a processor and a touch screen display responsive to signals from the processor to display a first game console key layout at a first time and a second game console key layout at a second time.

In another aspect, a method includes receiving input indicating which one from among at least first and second predetermined game console types is selected. The method also includes, based on the input, causing a touch sensitive display to present a game console key layout associated with game console type indicated by the input.

The details of the present invention, both as to its structure and operation, can best be understood in reference to the accompanying drawings, in which like reference numerals refer to like parts, and in which:

BRIEF DESCRIPTION OF THE DRAWINGS

FIG. 1 is a block diagram of a non-limiting example system in accordance with present principles;

FIG. 2 is a screen shot of the touch screen display of the universal game controller showing an example game console selection key layout;

FIG. 3 is a screen shot of the touch screen display of the universal game controller showing a first example control key layout;

FIG. 4 is a screen shot of the touch screen display of the universal game controller showing a second example control key layout; and FIG. 5 is a screen shot of the touch screen display of the universal game controller showing a third example control key layout.

DETAILED DESCRIPTION OF THE PREFERRED EMBODIMENT

This document describes an adaptable or universal game controller which can be used to emulate the controllers of popular game consoles, such as, without limitation, the PlayStation™ made by Sony, a controller made by Nintendo, X-box™ game controllers made by Microsoft, Amiga CD-32™ controllers, Atari Jaguar™ controllers, Gravis Gamepad™ controllers, Sega controllers, and Turbographics controllers, one or more of which terms may be subject to trademark protection. For ease of exposition trademark symbols will not be further used herein.

FIG. 1 shows a game controller 10 with hand-held, typically plastic housing 12 that is shaped to resemble a typical game controller for better and more familiar feel of a game controller. A thin plastic so-called "game controller skin" may surround the housing 12.

The housing 12 may contain a controller processor 14 and a tanigible computer readable medium 16 readable by the processor 14 and bearing instructions to enable the processor 14 to present two or more game control key layouts on a touch sensitive display 18 such as a touch sensitive liquid crystal display (LCD). With greater specificity, the display 18 can present a first control key layout at a first time (e.g., when a user selects a first type of game console), and at least a second control key layout at a second time (e.g., when a user selects a second type of game console).

The medium 16 may be, without limitation, disk-based or solid state storage and the processor 14 may be a digital microprocessor, it being understood that the same general description applies to the other processors and media described herein. If desired, L1 and L2 keys and R1 and R2 keys may be provided as shown on the top left and right edges, respectively, of the housing 12, implemented either by mechanical keys or by touch sensitive display keys.

In the example non-limiting implementation shown in FIG. 1, the controller 10 may be used with at least two game consoles 20, 22, each of which may include its own respective processor 24, 26 and computer readable medium 28, 30. It is to be understood that the controller 10 may be used with more than two game consoles.

A receiver 32 may communicate directly with the controller 10 over a wired or wireless link 34, and with the game console(s) 20, 22 over a wired or wireless link. The receiver 32 may have its own processor 36 and computer readable medium 38 and in a non-limiting embodiment, the controller 10 is responsible for control key display and user input only, while the receiver 32 is responsible for storing the various control key layouts the game consoles 20, 22. In other words, in one implementation the receiver processor 36 instructs the controller processor 14 which layout to present on the controller display 18. In addition, the receiver 32 can also store software drivers as well as hardware device compatibility such as compatible game console wires to connect the receiver 32 to the game console inputs with the game consoles 20, 22. In essence, the receiver 32 is responsible for transmitting and processing the signals from the universal game controller 10 and pass the signals on to the corresponding game console 20, 22. However, in other implementations present principles may be embodied by any of the processors described herein, and furthermore the receiver 32 may be integrated with one or more of the game console(s) 20, 22.

The game console(s) 20, 22 communicate with an audio-video appliance 40 such as a television that may include a video monitor 42 and one or more audio speakers 44. The appliance 40 may also include its own appliance processor 46 and computer readable medium 48. The appliance 40 can present images and sounds of computer games as the games are embodied in signals received from a game console 20, 22 under control input by means of the controller 10 and relayed to the game console by the receiver 32. While both game consoles 20, 22 are shown simultaneously communicating with the receiver 32 and appliance 40, it is to be understood that only a single console 20, 22 at a time typically will be in use and/or connected to the other components shown.

The universal game controller 10 can be battery operated (to allow mobility) or powered by the receiver 32 or through an electrical socket. Furthermore, the universal game controller 10 may be equipped with dual shock (tactile signal generators) and/or in-built speakers for greater entertainment value.

A user may select which game console 20, 22 control key layout to emulate on the controller display 18. The selection may be done by device discovery, i.e., when a user connects the game console 20 to the receiver 32, the receiver 32 detects the type of game console it is and instructs the controller 10 to display the key layout corresponding to the game console. Or, an initial presentation as shown in FIG. 2 may be presented on the display 18 and may include console type keys 50, each indicating the name of a particular console that is supported by the receiver 32. The user may then select the desired console type by touching the corresponding type key 50.

Once the console type has been established, the control key layout for that console type is presented on the controller display 18. FIGS. 3-5 show non-limiting example control key layouts that respectively correspond to a Sony Playstation layout, a Nintendo game console layout, and an xBox control layout.

Accordingly, as shown in FIG. 3 a control key layout may include navigation keys and action keys that can assume different functions depending on the particular game being played. For example and referring to FIG. 3, a navigation symbol 52 may be presented that is cruciform in shape to emulate a five-pole rocker-type navigation button. The navigation symbol 52 includes an tip key 54, a down key 56, a left key 58, and a right key 60, that may be respectively touched to cause a cursor on the appliance display 42 to move up, down, left, and right. While the navigation symbol 52 may be implemented as shown on the touch sensitive display 18, certain controls, potentially the navigation control keys, that are ubiquitous to most if not all game consoles may be implemented separately apart from the controller display 18 by, e.g., mechanical buttons.

Also, in some embodiments a user may be permitted to slide a finger on a navigation symbol to emulate a joystick-type cursor navigation device, causing the screen cursor to move in accordance with the direction and, if desired, speed of finger sliding.

The example non-limiting layout shown in FIG. 3 may also include, to the right of the navigation symbol 52 in a horizontal row, a select key 62 and a start key 64. Below the select and start keys 62, 64, L3 and R3 symbols may be presented. To the right of the select key 62 and start key 64, action keys 66, 68, 70, 72 may be presented and may be arranged in a diamond configuration shown, respectively shaped as a square, an "x", a circle, and a triangle.

Without limitation and only by way of illustrative example, action keys including the keys 66-72 as well as the L1, L2, L3, R1, R2, R3 keys may be used to represent a desire on the part of the user to cause a game character to shoot a weapon, select a weapon, throw an object or a punch, dive, block, climb, kick, disarm, roll over, crouch, call, spin, dash, jump, show status, etc.

FIG. 4 shows a second control layout in which a navigation key 74 may be presented on the left pair of the display 18 followed in a row by a select key 76 and start key 78. Action keys X, Y, A, and B may be presented as shown on the right part of the display 18. The action keys and navigation keys in FIG. 4 may have similar functions to those described above in relation to FIG. 3.

FIG. 5 shows a third control layout in which a navigation key 80 may be presented on the lower left part of the display 18. Above and slightly to the left of the navigation key 80, a "move" key 82 may be displayed followed in a row from left to right by a "previous menu" key 84, an "exit" key 86, and a start key 88. Action keys X, Y, A, and B may be presented as shown in a box-like or cruciform-like arrangement on the right part of the display 18. The action keys and navigation keys in FIG. 5 may have similar functions to those described above in relation to FIG. 3.

It may now be appreciated that among other advantages, the controller provides for backward compatibility so that it may be programmed to emulate the key layout of an older controller that may no longer be available, so that an owner of an older game console can still use the console. Further, in addition to action and navigation symbols the display can present an image of a keyboard that can be manipulated to input alpha-numeric characters.

While the particular UNIVERSAL GAME CONSOLE CONTROLLER is herein shown and described in detail, it is to be understood that the subject matter which is encompassed by the present invention is limited only by the claims.

What is claimed is:

1. A game console controller comprising:
   a hand-holdable housing;
   at least one liquid crystal display (LCD) on the housing, the LCD caused to present, depending on what type of game console a user has selected, a first controller key layout for a first type of game console or a second controller key layout for a second type of game console, a key layout including plural keys selectable by a user to input commands to a game console, wherein the first controller key layout includes a navigation symbol that is cruciform in shape and that includes an up key, a down key, a left key, and a right key, the navigation symbol containing the up key, down key, left key, and right key within a closed cross-shaped border, wherein the first layout includes in a horizontal row a select key and a start key and below the select and start keys, L3 and R3 symbols, the first layout also including to the right of the select key and start key action keys arranged in a diamond configuration and respectively shaped as a square, an "x", a circle, and a triangle and the second controller key layout includes at least a select key.

2. The controller of claim 1, wherein the LCD is caused to present a controller key layout for a third type of game console.

3. The controller of claim 1, wherein a controller key layout for one and only one game console is presented at one time on the display.

4. The controller of claim 1, wherein the controller includes a controller processor controlling the display, the controller processor receiving layout signals from a receiver and in response causing the display to present either the first or the second layout.

5. The controller of claim 1, wherein the first layout includes navigation keys and action keys.

6. The controller of claim 1, wherein the second layout further includes a start key, action X, Y, A, and B being presented on a right part of the display.

7. The controller of claim 1, wherein the second layout includes, in a row from left to right, a "previous menu" key, an "exit" key, and a start key, keys X, Y, A, and B being presented in a box-like or cruciform-like arrangement on a right part of the display.

8. Apparatus, comprising:
at least one processor; and
at least one touch screen display responsive to signals from the processor to display a first game console key layout at a first time and a second game console key layout at a second time, wherein the first layout includes in a horizontal row a select key and a start key and below the select and start keys, L3 and R3 symbols, the first layout also including to the right of the select key and start key action keys arranged in a diamond configuration and respectively shaped as a square, an "x", a circle, and a triangle, wherein the first game console key layout is selected responsive to a first game counsel being in communication with the processor at the first time and the second game console key layout is selected responsive to a second game counsel being in communication with the processor at the second time and wherein the second controller key layout includes at least a select key.

9. The apparatus of claim 8, wherein the first layout includes navigation keys and action keys.

10. The apparatus of claim 9, wherein the first layout includes a navigation symbol that is cruciform in shape and that includes an up key, a down key, a left key, and a right key.

11. The apparatus of claim 8, wherein the second layout further includes a start key, action X, Y, A, and B being presented on a right part of the display.

12. The apparatus of claim 8, wherein the second layout includes, in a row from left to right, a "previous menu" key, an "exit" key, and a start key, keys X, Y, A, and B being presented in a box-like or cruciform-like arrangement on a right part of the display.

13. Method comprising:
receiving input indicating which one from among at least first and second predetermined game console types is selected;
based on the input, causing a touch sensitive display to present a game console key layout associated with game console type indicated by the input, wherein a second layout is associated with the second predetermined game console type and includes a select key and a start key, action X, Y, A, and B being presented on a right part of the display, wherein the input indicates the first predetermined game console type at a first time and a first key layout is displayed in response, and wherein the input indicates the second predetermined game console type at a second time and a second key layout is displayed in response, a game console communicating with the display through a receiver and the first layout includes at least a select key.

14. The method of claim 13, wherein the first layout includes in a horizontal row the select key and a start key arid below the select and start keys, L3 and R3 symbols, the first layout also including to the right of the select key and start key action keys arranged in a diamond configuration and respectively shaped as a square, an "x", a circle, and a triangle.

15. The method of claim 13, wherein the second layout includes, in a row from left to right, a "previous menu" key, an "exit" key, and the second key, keys X, Y, A, and B being presented in a box-like or cruciform-like arrangement on a right part of the display.

* * * * *